United States Patent [19]

Bleckmann

[11] Patent Number: 4,558,205

[45] Date of Patent: Dec. 10, 1985

[54] ELECTRIC CONTINUOUS FLOW WATER HEATER HAVING DUAL TEMPERATURE SAFETY LIMITING DEVICES

[76] Inventor: Ingo Bleckmann, Ignaz-Rieder-Kai 11, A-5020 Salzburg, Austria

[21] Appl. No.: 599,079

[22] Filed: Apr. 11, 1984

[30] Foreign Application Priority Data

Apr. 13, 1983 [DE] Fed. Rep. of Germany ... 8310976[U]

[51] Int. Cl.⁴ .................. H05B 1/02; A47J 31/56; F24H 1/10
[52] U.S. Cl. .................. 219/283; 99/281; 99/288; 219/301; 219/308; 219/328; 219/330
[58] Field of Search .............. 219/283, 301, 302, 308, 219/328, 330; 99/285, 281, 302 R, 288

[56] References Cited

U.S. PATENT DOCUMENTS

| 3,187,164 | 6/1965 | Andrich | 219/328 X |
| 3,711,681 | 1/1973 | Leuschner | 99/281 X |
| 4,083,295 | 4/1978 | Hollingsworth | 99/302 R |
| 4,139,761 | 2/1979 | Obrowski | 99/285 X |
| 4,214,148 | 7/1980 | Fleischhauer | 99/285 X |

FOREIGN PATENT DOCUMENTS

| 1929117 | 12/1965 | Fed. Rep. of Germany . | |
| 7412048 | 8/1974 | Fed. Rep. of Germany . | |
| 2441467 | 3/1976 | Fed. Rep. of Germany . | |
| 2507479 | 8/1976 | Fed. Rep. of Germany . | |
| 2701692 | 7/1978 | Fed. Rep. of Germany | 219/283 |
| 2808184 | 9/1979 | Fed. Rep. of Germany | 219/281 |

*Primary Examiner*—A. Bartis
*Attorney, Agent, or Firm*—Mallinckrodt, Mallinckrodt, Russell & Osburn

[57] ABSTRACT

An electric continuous flow water heater for domestic appliances, such as coffeemaking machines, has a water heating assembly comprising a tubular electric resistance heating element disposed in side-by-side heat exchange relation with a water flow pipe. The assembly is bent into a generally horseshoe-shaped configuration and a heat conductive bridge member extends across the heating element and water pipe substantially centrally of the length thereof and is in contact therewith. A temperature dependent switching means, such as a thermostat or a PTC element, and a thermal safety fuse are electrically connected in series with each other and the heating element are carried on the bridge member with the switching element secured on one side of the heating element-water pipe assembly and the safety fuse secured on the other side of the assembly. The switching element and fuse are operable independently of each other and together form a temperature limiting means to regulate and safeguard the water heating assembly against excessive temperature and excess current flow.

10 Claims, 2 Drawing Figures

ELECTRIC CONTINUOUS FLOW WATER HEATER HAVING DUAL TEMPERATURE SAFETY LIMITING DEVICES

BACKGROUND OF THE INVENTION

Various forms of electrical continuous flow heaters for domestic appliances such as coffee making machines and the like are known, having a tubular heater and a water flow pipe, together with a temperature limiting means to safeguard the appliance.

German specification DE-A1 No. 25 07 479 disclosed such an electrical heater arrangement for domestic coffee making machines, comprising a unit, which is bent into an at least substantially annular configuration, comprising a tubular heater and a water flow pipe. The connecting ends of the arrangement, which project out of the annular configuration, are joined together by way of a sheet metal housing which carries a thermostat. German Utility Model No. 74 12 048 also discloses a continuous-flow or through-flow heater for heating water for a coffee making machine, comprising an arrangement of a tubular heater and a water flow pipe, which is of a generally horseshoe-shaped configuration. In that construction, a sheet metal strip which carries a thermostat is secured to the tubular heater as by welding or soldering. Further structures of the general kind set forth above, including thermostats therein, are described in German Utility Model No. 19 29 117 and in German specification DE-A1 No. 28 08 184.

In another form of continuous flow heater for an appliance such as a coffee making machine, as disclosed in German published specification (DE-AS) No. 24 41 467, there is a water chamber which is heated by a tubular heater. In that construction, a temperature fuse of micro type is associated with the water chamber, while a further thermostat device is disposed outside the water chamber in the vicinity of the connecting ends of the tubular heater.

All the coffee making machines of the kind discussed above suffer from the problem set out below, which is referred to in some of the above-mentioned specifications but which hitherto has not been solved in a fully satisfactory manner:

The thermostat associated with the heater for controlling the operation thereof is required to perform at least three completely different functions. First of all, it is required to control the temperature of the water which is in the water flow pipe, to such a level that on the one hand the vapour pressure is sufficient to drive the water up through the riser pipe for it to flow out over the coffee powder to make the coffee, while on the other hand the amount of steam produced by operation of the heater should not be excessive, because that involves a waste of energy while also resulting in a snorting noise as the steam issues from the riser pipe, which is often so severe as to be quite unacceptable. Secondly, when the coffee pot or like beverage container is set down on the machine, the container should be maintained at a temperature of about 80° C. so that even after the full amount of water introduced into the supply tank of the machine has flowed through the heater assembly, the coffee produced from the water can still be kept hot over a period of several hours by virtue of the pot or container resting on the heating assembly of the machine. Thirdly, the current supply to the machine should be cut off in the event of overheating, as may occur for various reasons, for example because the tubular heater burns through or melts. It will be appreciated that overheating of that kind can result in a serious risk of fire, particularly when the appliance has a plastic casing as is nowadays generally the case. Although that cause of damage occurs relatively rarely, being generally of the order of magnitude of one to one million, experience has shown that in the event of a machine such as a coffee making machine suffer from overheating, and catching fire as a result, to such an extent as to be completely burnt out, considerable damage may result, being for example to such an extent as to set fire to the room in which the coffee machine is placed, possibly even being completely burnt out.

Various devices and artifices may be employed, and the heating output of the arrangement may be suitably matched to the thermostat employed, in order thereby to control the situation in such a way that one and the same thermostat can simultaneously perform two of the three functions referred to above. However, as far as the applicant is aware, no arrangement has hitherto succeeded in performing all three functions as referred to above, in a manner which is completely satisfactory under practical circumstances.

SUMMARY OF THE INVENTION

An object of the present invention is to provide an electrical continuous flow heater such as to provide for quiet operation with a low level of power consumption when used in a machine for the preparation of a beverage such as coffee.

Another object of the present invention is to provide an electrical continuous flow heater for a beverage making machine such that the temperature of the drink prepared, in a container positioned on the heater unit, is maintained at a desired value.

Still another object of the present invention is to provide a heater unit for a beverage making machine such that the feed of current is reliably cut off in the event of overheating of the machine.

Yet another object of the invention is to provide a continuous flow heater arrangement which includes safety limiting means reliably responsive both to excessive temperatures and to excess current flow, while being inexpensive and easy to produce.

A further object of the invention is to provide a domestic machine such as a coffee machine which is reliable and safe in operation, while being of an inexpensive construction.

These and other objects are achieved by an electrical heater unit for a domestic appliance such as a beverage making machine, for example a coffee making machine, comprising a tubular heater member and a water flow pipe, in conjunction with a temperature limiting means which includes a bridge member disposed in contact with the tubular heater member and/or the water pipe. The temperature limiting means includes at least two current limiting or safety elements which operate independently of each other, being carried on the bridge member.

In accordance with a preferred feature of the invention, the temperature limiting means includes a mechanical, electrical or electronic switching means which is dependent on temperature for operation thereof, such as a thermostat or a PTC element, and a safety cut-out such as a fusible cut-out device.

The tubular heater together with the water flow pipe may be disposed between the above-mentioned temperature-dependent switching means and the safety cut-out device, while the latter may be disposed in the direct vicinity of the tubular heater, with the switching means arranged at a greater distance from the tubular heater, on the bridge member.

The water pipe and the tubular heater may form an assembly which is bent in a generally annular configuration, e.g. a generally horseshoe-shaped configuration, and the bridge member may comprise a sheet metal strip which at least partially engages around the assembly of the water pipe and the tubular heater. The switching means may be secured to the end of the sheet metal strip, which is bent up so as to project into the middle of the space within the annularly configurated assembly of the water flow pipe and the tubular heater. The safety fuse may preferably be clamped in a bent lug portion of the bridge member, which projects outwardly from the assembly of the water pipe and the tubular heater.

In accordance with a further feature, the sheet metal strip forming the bridge member may be secured to the assembly of the water pipe and the tubular heater, in the centre between the two connecting ends of the tubular heater.

The invention further provides a machine such as a coffee machine which incorporates a heater unit in accordance with the principles of the present invention.

Further objects, features and advantages of the present invention will be apparent from the following description of a preferred embodiment of the invention.

DESCRIPTION OF THE PREFERRED EMBODIMENT

Figure 1:
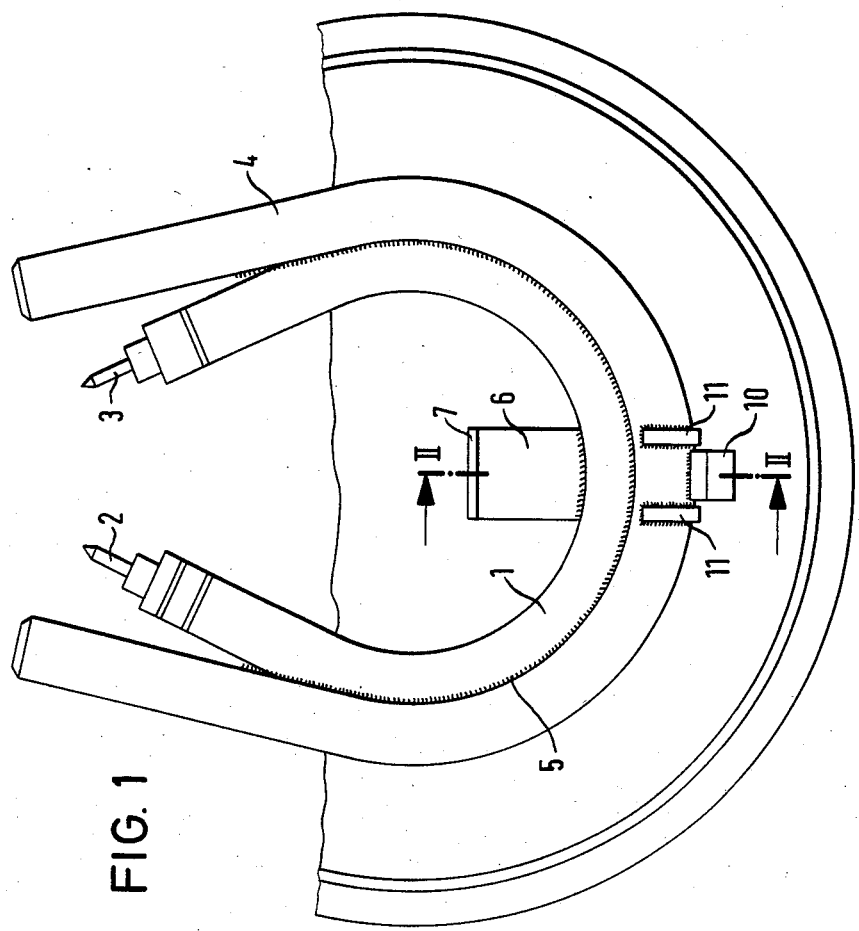
FIG. 1 shows a plan view of the heater arrangement.

Referring now to the drawing, shown therein is a continuous flow or through-flow heater comprising a tubular heater generally indicated by reference numeral 1, with suitable connecting ends 2 and 3. The tubular heater 1 is bent into a generally annular or horseshoe-shaped configuration, as shown. The heater further comprises a continuous flow pipe 4 for carrying a flow of water therethrough, which is bent into a similar configuration to that of the tubular heater 1. As can be clearly seen from FIG. 1, the water pipe 4 is disposed outwardly of the tubular heater 1, in the horseshoe-like assembly formed by the pipe 4 and the tubular heater 1, and is connected to the tubular heater 1 by suitable means such as a weld or solder seam as indicated at 5.

The assembly comprising the tubular heater 1 and the water flow pipe 4 also has a bridge member 6 which is made for example from sheet metal strip and which is connected to the tubular heater 1 and the water pipe 4 at a position centrally between the heater connecting ends 2 and 3, as can be clearly seen from FIG. 1. The bridge member 6 thus extends across and in contact with both the tubular heater 1 and the water pipe 4.

At one end of the bridge member 6, it is bent over at substantially a right angle to form a lug portion 7 which, when the assembly of the tubular heater 1 and the water pipe 4 is in its normal operative position of being substantially horizontal, extends upwardly in a substantially vertical direction. Thus, in FIG. 1, the lug portion 7 extends towards the person viewing the drawing. As can be seen from FIG. 2, the lug portion 7 has a bore or hole 8 therethrough.

At a position intermediate its ends and thus at a spacing from the lug portion 7, the bridge member 6 also has a depression 9 forming a trough-like portion in which the tubular heater 1 is suitably secured as by soldering, brazing or welding. Finally, the second end of the bridge member 6, which is remote from the end forming the lug portion 7, is bent and cut in the manner clearly shown in the drawings, in such a way as to form a curved lug portion 10, the purpose of which will be explained hereinafter, and two fork-like arm portions 11 which engage around the water pipe 4 to hold it with secure contact against the bridge member 6 and also against the tubular heater 1, as shown in FIG. 2.

Figure 2:
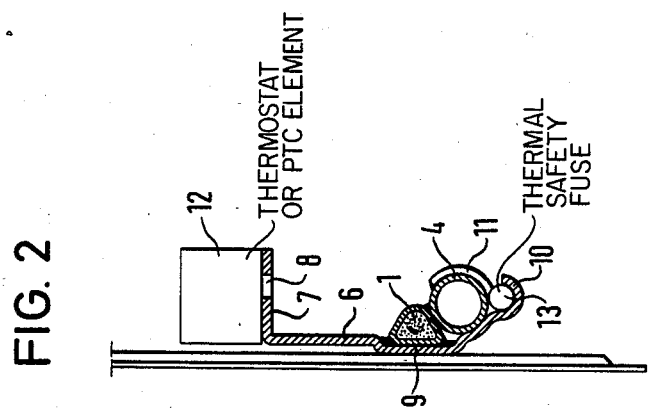
FIG. 2 shows a view in cross-section taken along line II—II in FIG. 1.

In FIG. 2, reference numeral 12 denotes a thermostat 12 which is connected to the bridge 6 at the bent lug portion 7 thereof, by way of the bore 8. At the other end of the bridge member, a protector device such as a safety fuse as indicated at 13, which may be in the form referred to as an 'Efen' safety device is clamped in position in the lug portion 10 which thus extends partially therearound, to hold it against the water pipe 4. The thermostat 12 and the safety device 13 are disposed independently of each other in series in the current supply circuit connected to the connecting ends 2 and 3 of the tubular heater 1, more specifically, in such a way that the circuit is broken both when the thermostat 12 opens and also when the safety device 13 operates as by fusing. The safety device 13 is preferably a fusible safety device which can be replaced by an after-sales or service department or by the factory.

It has been found that the construction as described above surprisingly permits the three temperature regulating functions referred to above to be satisfactorily harmonised with each other. As will be appreciated, the thermostat 12, by virtue of being carried on the bent lug portion 7 of the bridge member 6, which is thus bent up so as to project into the middle of the assembly comprising the tubular heater 1 and the water pipe 4, is disposed at a position at which it is directly under the bottom of a beverage container such as a coffee pot or the like (not shown) which is set down in position on the machine, above the heating assembly, in order to keep the beverage in the container hot over a reasonably long period of time. The thermostat 12 can therefore be set in such a way that the supply of current to the connecting ends 2 and 3 of the tubular heater is switched on if the temperature of the coffee or other beverage in the pot standing on the heater assembly falls below a set temperature of for example 80° C., thus ensuring that the warming function of the heater assembly is performed in the optimum manner.

On the other hand, the length and width of the bridge member 6 are such that, when the thermostat is set in the above-indicated manner to maintain a beverage temperature of around 80° C., the supply of current to the tubular heater 1 is switched off when the temperature in the middle of the water pipe 4 or the tubular heater 1 exceeds the optimum value required for heating the water flowing through the water pipe 4 in a beverage-making operation.

If, after a prolonged period of operation, for example due to the insulation value of the tubular heater 1 being impaired, the tubular heater 1 burns through or suffers similar damage which could cause a fire to occur, then under all such circumstances the safety fuse 13 burns out before a temperature is reached, at which the casing of the tubular heater 1 will melt or there will be a risk of fire due to radiant heat. In this connection, it should be noted that, although the safety fuse 13 is set to operate at a higher temperature value than the thermostat 12, the distance of the safety fuse 13 from the tubular heater 1 is less than the distance of the thermostat 12 from the tubular heater 1, so that the safety fuse 13 will reliably respond in all circumstances, more particularly where it is disposed in the direct vicinity of the water pipe 4, being preferably in virtually direct contact therewith as illustrated in FIG. 2. Furthermore, in the event of the tubular heater 1 burning through, an increased flow of current will generally occur, due to the resulting arcing phenomenon, and, while the thermostat 12 will obviously not respond to that increased flow of current, the safety fuse 13 will do so, thereby to cut off the current.

It should be appreciated that, in place of a thermostat 12, the arrangement may use one or more resistance elements having a positive temperature coefficient, referred to as PTC-elements, or other temperature-dependent mechanical or electrical switching devices.

It will be seen therefore that the above-described heater arrangement provides for satisfactory control of the temperatures involved in operation thereof, such as to provide for quiet operation with a low level of power consumption when used for example in a coffee making machine. Furthermore, the supply of current to the heater will be reliably and permanently cut off in the event of overheating, by virtue of the safety fuse responding to a current value which is in excess of a set safe level.

Various modifications and alterations may be made in the abovedescribed construction without thereby departing from the spirit and scope of the present invention.

What is claimed is:

1. An electrical, continuous flow heater for a domestic appliance, comprising an assembly of an electrical heater element and a water flow pipe adapted to be heated by the heater element; a heat conductive bridge member in contact with at least one of said heater element and said water flow pipe and extending thereacross into the vicinity of the domestic appliance to be heated; and at least first and second thermally responsive current supply-limiting elements carried on the bridge member in mutually spaced relationship and in thermal contact with the bridge member, said current supply-limiting elements being electrically connected in series with each other and with said heater element and being operable independently of each other, one being located at one side of said assembly and the other at the opposite side of said assembly.

2. A heater as set forth in claim 1 wherein said current supply-limiting elements respectively comprise a temperature-dependent switching means and a safety fuse.

3. A heater as set forth in claim 2 wherein said switching means is a thermostat.

4. A heater as set forth in claim 2 wherein said switching means is a PTC-element.

5. A heater as set forth in claim 2, wherein said bridge member comprises a rigid, heat conductive strip, which at least partially engages the assembly of said water pipe and said tubular heater, said assembly being of a generally annular configuration; and wherein said bridge member has a first end portion, which projects substantially into the middle of the space enclosed by said annular configuration and which carries said switching means, and a second end portion providing a holding lug that clamps said safety fuse in position against said assembly.

6. A heater as set forth in claim 1 wherein said water pipe and said heater element are of substantially concentric, horseshoelike configuration, and wherein said bridge member is secured thereto substantially centrally of the lengths thereof.

7. An electrical continuous flow heater for a beverage making machine comprising: an assembly of a water pipe adapted to carry a flow of water therethrough and an electrical tubular heater adapted to heat the water as it flows through said water pipe; circuit means for supplying current to said tubular heater; a heat-conductive bridge member in contact with at least one of said water pipe and said tubular heater and extending into the vicinity of the location for receiving said beverage making machine; a thermally responsive safety protector deviced disposed on said bridge-member adjacent to the assembly of said water pipe and said tubular heater and connected into said current supply circuit means in series with said heater and responsive to an excess flow of current therethrough; and a temperature-dependent switching means disposed on said bridge member at a spacing from said assembly of said water pipe and said tubular heater adjacent to said location for receiving said beverage making machine and connected into said current supply circuit means in series with said safety protector devices and said heater, so as to be responsive to a given temperature level to switch off the supply of current through said circuit means to said tubular heater, whereby said safety protector device provides a current-limiting safety function and said switching means provides a temperature-limiting regulating function, said safety protector device being positioned at one side of said assembly and said switching means being positioned at the opposite side of said assembly.

8. A heater as set forth in claim 7, wherein said bridge member comprises a rigid, heat conductive strip, which at least partially engages the assembly of said water pipe and said tubular heater, said assembly being of a generally annular configuration; and wherein said bridge member has a first end portion which projects substantially into the middle of the space enclosed by said annular configuration and which carries said switching means, and a second end portion providing a holding lug that clamps said safety fuse in position against said assembly.

9. A heater as set forth in claim 8, wherein the said heat conductive strip is sheet steel having one end portion bent to provide, at its terminus, said holding lug and to provide, next along the length of the strip, a seat for said water pipe; wherein there are cut and bent from said bent portion fork-like arms that engage said water pipe and hold it firmly in place in said seat against said strip and said tubular heater; and wherein the other end portion of the strip is bent at substantially right angles to the strip in the same direction as said holding lug is bent, said bent other end portion of the strip having secured thereto said temperature-dependent switching means.

10. A heater as set forth in claim 9, wherein a portion of said strip next along the length of the strip is depressed as a trough in which said tubular heater is positioned.

* * * * *